United States Patent
Campbell et al.

(10) Patent No.: US 12,308,485 B2
(45) Date of Patent: May 20, 2025

(54) MOLTEN ELECTROLYTE DUAL-PHASE MEMBRANES FOR INTERMEDIATE TEMPERATURE FUEL CELLS

(71) Applicant: Lawrence Livermore National Security, LLC, Livermore, CA (US)

(72) Inventors: Patrick Campbell, Oakland, CA (US); Maira Ceron Hernandez, Livermore, CA (US); Vedasri Vedharathinam, Fremont, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 539 days.

(21) Appl. No.: 16/435,131

(22) Filed: Jun. 7, 2019

(65) Prior Publication Data

US 2019/0379063 A1    Dec. 12, 2019

Related U.S. Application Data

(60) Provisional application No. 62/682,729, filed on Jun. 8, 2018.

(51) Int. Cl.
| | |
|---|---|
| *H01M 8/0236* | (2016.01) |
| *H01M 8/0267* | (2016.01) |
| *H01M 8/04089* | (2016.01) |

(52) U.S. Cl.
CPC ....... *H01M 8/0236* (2013.01); *H01M 8/0267* (2013.01); *H01M 8/04089* (2013.01)

(58) Field of Classification Search
CPC .......................... H01M 8/0267; H01M 8/04089
See application file for complete search history.

(56) References Cited

U.S. PATENT DOCUMENTS

| | | |
|---|---|---|
| 3,472,746 A | 10/1969 | Heredy |
| 4,721,513 A | 1/1988 | Smith et al. |

(Continued)

FOREIGN PATENT DOCUMENTS

WO        2018148524 A1        8/2018

OTHER PUBLICATIONS

Ganley, "An intermediate-temperature direct ammonia fuel cell with a molten alkaline hydroxide electrolyte", Journal of Power Sources, vol. 178, Issue 1, Mar. 15, 2008, pp. 44-47 (Year: 2008).*

(Continued)

*Primary Examiner* — Milton I Cano
*Assistant Examiner* — Joshua P McClure
(74) *Attorney, Agent, or Firm* — Zilka-Kotab, P.C.

(57) ABSTRACT

In one aspect of an inventive concept, a fuel cell system includes a cathode and an anode, a porous ceramic support positioned between the cathode and anode, and a molten electrolyte mixture in pores of the ceramic support. In another aspect of an inventive concept, a method for producing energy includes directing a gas stream through a cathode, where an inner side of the cathode is adjacent to a dual phase membrane including a ceramic support infiltrated with a molten electrolyte mixture, sweeping an outer side of the anode with water, where an inner side of the anode is adjacent to the dual phase membrane, and collecting energy from the anode. The dual phase membrane is sandwiched between the cathode and an anode.

23 Claims, 7 Drawing Sheets

(56) References Cited

U.S. PATENT DOCUMENTS

| | | | | |
|---|---|---|---|---|
| 5,075,277 | A | * | 12/1991 | Saiai ............... B01J 23/10 502/332 |
| 2002/0094469 | A1 | | 7/2002 | Yoshizumi et al. |
| 2004/0166380 | A1 | | 8/2004 | Gorte et al. |
| 2005/0282063 | A1 | | 12/2005 | Zecevic et al. |
| 2008/0032183 | A1 | * | 2/2008 | Xu ............... H01M 8/142 429/529 |
| 2011/0036237 | A1 | * | 2/2011 | Okada ............... B01D 71/76 427/244 |
| 2012/0021339 | A1 | * | 1/2012 | Ryu ............... H01M 8/1213 429/535 |
| 2015/0263351 | A1 | | 9/2015 | Lee et al. |
| 2016/0322650 | A1 | * | 11/2016 | Yamada ............... H01M 8/2425 |
| 2018/0326524 | A1 | * | 11/2018 | Nicholas ............... H01M 8/0245 |

OTHER PUBLICATIONS

Datasheets for Zircar products (Year: NA) (Year: NA).*

Deleebeeck, L., Hansen, K.K. Hybrid direct carbon fuel cells and their reaction mechanisms—a review. J Solid State Electrochem 18, 861-882 (2014). https://doi.org/10.1007/s10008-013-2258-1 (Year: 2013).*

L. Deleebeeck and K. Kammer Hansen, HDCFC Performance as a Function of Anode Atmosphere (N2-CO2), J. Electrochem. Soc. 161 F33. (2014) (Year: 2014).*

Wen Xing, Thijs Peters, Marie-Laure Fontaine, Anna Evans, Partow Pakdel Henriksen, Truls Norby, Rune Bredesen, Steam-promoted $CO_2$ flux in dual-phase $CO_2$ separation membranes, Journal of Membrane Science, vol. 482, 115-119 (2015). https://doi.org/10.1016/j.memsci.2015.02.029. (Year: 2015).*

International Search Report and Written Opinion from PCT Application No. PCT/US 19/35872, dated Aug. 28, 2019.

International Preliminary Examination Report from PCT Application No. PCT/US 19/35872, dated Dec. 17, 2020.

Konde, S., "Development of an Intermediate Temperature Molten Salt Fuel Cell," A thesis submitted to Worcester Polytechnic Institute, Feb. 2009, pp. 1-115.

Urquidi-MacDonald et al., "Design and Test of a Carbon-Tolerant Alkaline Fuel Cell," arXiv, Apr. 19, 2005, 78 pages, retrieved from https://arxiv.org/abs/physics/0504130.

Hibino et al., "Intermediate-temperature alkaline fuel cells with non-platinum electrodes," Journal of Materials Chemistry A, No. 1, 2013, pp. 7019-7022.

Hinksman et al., "Enviornmental stress cracking of poly (vinylidene fluoride) and welds in alkaline soultions," Polymer Degradation and Stability, vol. 68, 2000, pp. 299-305.

Chempath et al., "Density Functional Theory Study of Degradation of Tetraalkylammonium Hydroxides," Journal of Physical Chemistry C, vol. 114, No. 27, 2010, pp. 11977-11983.

Miles, M.H., "Exploration of molten hydroxide electrochemistry for thermal battery applications," Journal of Applied Electrochemistry, vol. 33, 2003, pp. 1011-1016.

Blackledge et al., "Engineering of a Single Alkaline Fuel Cell Part II: Long-Term Operation in Air," i-manager's Journal on Electrical Engineering, vol. 2, No. 4, Apr.-Jun. 2009, pp. 33-43.

Murakami et al., "Electrolytic ammonia synthesis from water and nitrogen gas in molten salt under atmospheric pressure," Electrochimica Acta, vol. 50, 2005, pp. 5423-5426.

U.S. Appl. No. 62/524,329, filed Jun. 23, 2017.

U.S. Appl. No. 62/457,087, filed Feb. 9, 2017.

Weibel et al., "Modeling the Anodic Half-Cell of a Low-Temperature Coal Fuel Cell," Angewandte Chemie International Edition, vol. 44, 2005, pp. 5682-5686.

* cited by examiner

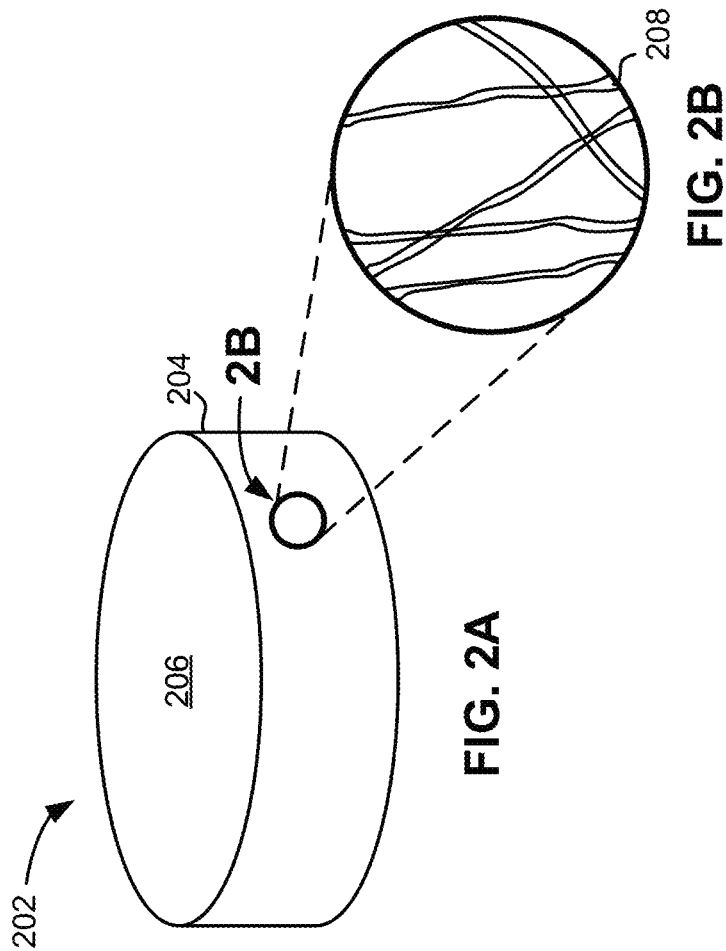
FIG. 2A
FIG. 2B
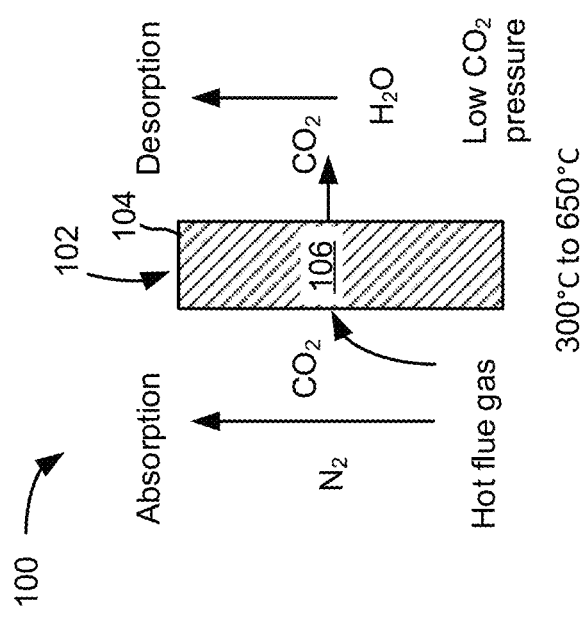
FIG. 1

MOLTEN ELECTROLYTE DUAL-PHASE MEMBRANES FOR INTERMEDIATE TEMPERATURE FUEL CELLS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to anion exchange fuel cells, and more particularly, this invention relates to molten hydroxide dual-phase membranes for carbonate management and energy production using intermediate temperature fuel cells.

BACKGROUND

A typical fuel cell has an ion conductive membrane that is impermeable to gas. In addition, fuel cells, having two electrodes that are separated by the membrane, transport ions from one electrode to the other and consume hydrogen and oxygen to produce water, heat, and electricity. The membrane composition (e.g. proton exchange membrane (PEM), anion exchange membrane (AEM), dual phase membrane, etc.) of the fuel cell determines the species that are transported across the membrane (PEM moves protons, AEM moves anions such as typically hydroxide ions $OH^-$), the kind of catalysts used, the temperature range of operation, etc. Alkaline Fuel Cells (AFCs) were one of the first fuel cell technologies developed and in conventional applications use a membrane that includes a solution of aqueous potassium hydroxide (KOH) as the electrolyte supported in porous medium, such as asbestos. Early uses of the AFC systems by NASA generated electricity at nearly 70% efficiency using aqueous solution of KOH.

AFC systems have evolved to include a hydroxide conducting polymer membrane, namely anion exchange membrane (AEM), to replace the aqueous hydroxide solution; however, these systems are costly and operate at a low hydroxide conductivity. Moreover, conventional AEM fuel cells having dense and gas impermeable membrane saturated with aqueous alkaline hydroxide solution have several challenges. Conventional AEM fuel cells tend to rely on a feed of pure oxygen rather than air, because, conventional AEM membrane systems suffer from the problem of carbon dioxide ($CO_2$) poisoning, when air used as the oxidant in the fuel cell. The poisoning reaction (see below, Equation 1) includes the $CO_2$ reacting with the KOH thereby depleting the hydroxide ions ($OH^-$) in the fuel cell, and leading to a reduction of ionic conductivity of the electrolyte. Of note, K in Equation 1 may represent a generic alkali metal cation.

$$CO_2 + KOH \leftrightarrow K_2CO_3 + H_2O \qquad \text{Equation 1}$$

Furthermore, the precipitated $K_2CO_{3(s)}$ tends to block the pores of the gas diffusion layer (GDL) of the membrane-electrode interface. In addition, the conversion of KOH to less soluble $K_2CO_3$ tends to slow down the rate of oxidation of fuel at the anode thereby leading to sluggish (e.g. decreased) kinetics. The $CO_2$ poisoning effects tend to be rapid and severe. To overcome the problem of $CO_2$ poisoning that poses restrictions to the use of pure oxygen, a focus has turned to removing the $CO_2$ from air before feeding the air to the alkaline fuel cell. However, $CO_2$ management systems tend to be costly and cumbersome, thereby rendering conventional AEM fuel cells unfit for use in distributed and mobile applications.

Another drawback of conventional AEM fuel cells is that both aqueous hydroxide based membranes and typical polymer based anion exchange membranes tend not to operate at an intermediate temperature range. As described above, conventional AEM fuel cells with hydroxide ion electrolytes tend to operate at low temperatures of less than 100° C. In case of $CO_2$ poisoning in conventional AEM fuel cells operating at the lower temperatures, the increase in carbonate concentration, correlating to the decrease in hydroxide ions, results in a carbonate precipitate (since carbonate has a lower solubility than hydroxide) and consequently results in a decrease in conductivity.

There are a number of reasons why an AEMFC operation in the intermediate temperature regime (in a range of about 150° C. to about 400° C.) would be advantageous. At elevated temperatures, catalysts are more tolerant of impurities in the $H_2$ fuel. Moreover, the kinetics of ion and gas diffusion are improved, and the rate of the overall reaction is improved. Thus, it would be desirable to develop AEMFCs that operate at an intermediate temperature (in a range of about 150° C. to about 400° C.) that may provide high ionic conductivity and improved reaction kinetics, as well as lower costs associated with fuel purification.

Moreover, alkaline and AEM fuel cells have received less commercial development than proton exchange fuel cells (PEMFCs) due to the $CO_2$ poisoning and other issues. However, in PEM fuel cells, there is a reliance on costly platinum group metal (PGM) materials as catalysts in the porous electrodes. AEM fuel cells can operate both with PGM and non-PGM catalysts. Moreover, it would be desirable to develop an AEM fuel cell that could utilize air without $CO_2$ poisoning at an intermediate temperature range with any catalyst/electrode material and not be limited to specific materials, for example specifically PGM catalysts or specifically non-PGM catalysts.

SUMMARY

In one aspect of an inventive concept, a fuel cell system includes a cathode and an anode, a porous ceramic support positioned between the cathode and anode, and a molten electrolyte mixture in pores of the ceramic support.

In another aspect of an inventive concept, a method for producing energy includes directing a gas stream through a cathode, where an inner side of the cathode is adjacent to a dual phase membrane including a ceramic support infiltrated with a molten electrolyte mixture, sweeping an outer side of the anode with water, where an inner side of the anode is adjacent to the dual phase membrane, and collecting energy from the anode. The dual phase membrane is sandwiched between the cathode and an anode.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 1 is a schematic drawing of a reversible $CO_2$ absorption by molten hydroxides, according to one inventive concept.

FIG. 2A is a schematic drawing of a porous ceramic structure, according to inventive concepts described herein.

FIG. 2B is a schematic drawing of a magnified view of circle 2B of FIG. 2A.

DETAILED DESCRIPTION

Figure 3:
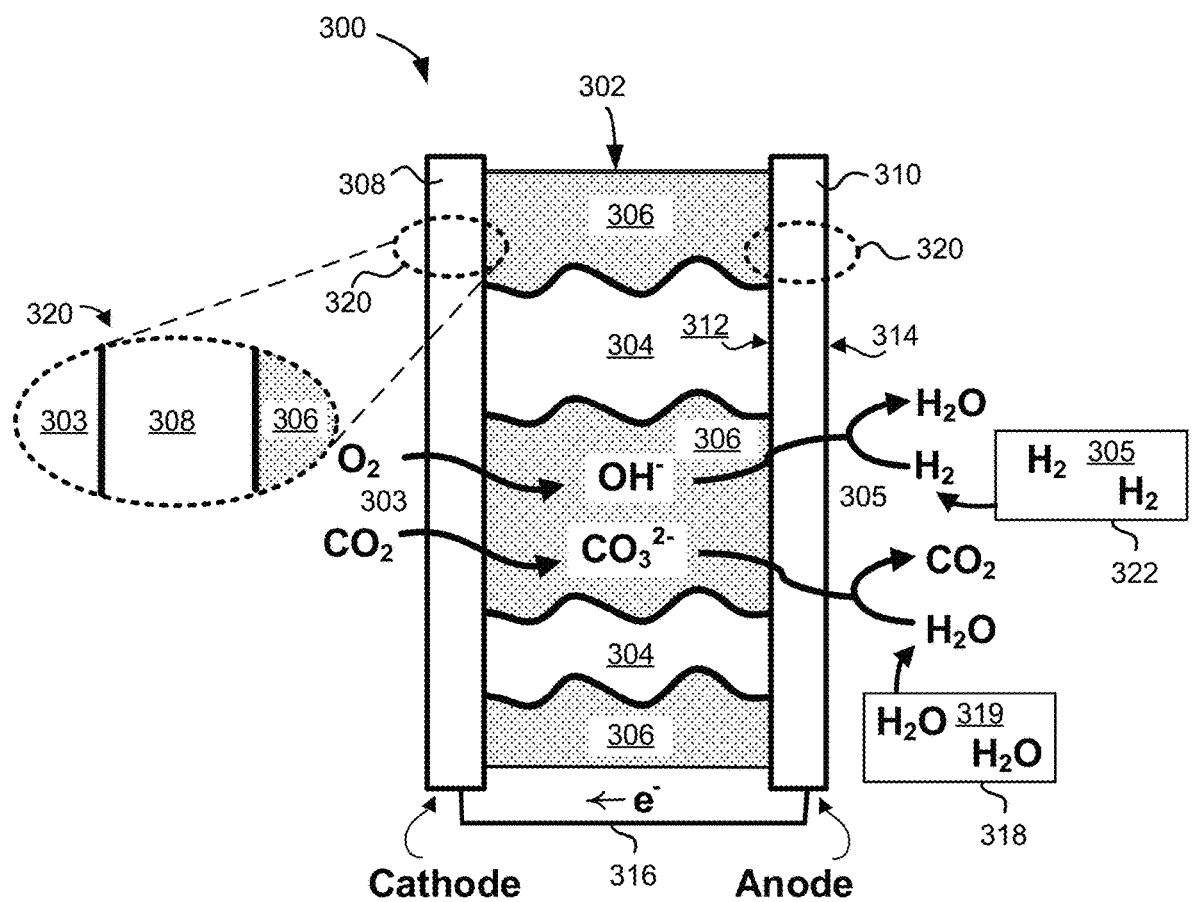
FIG. 3 is a schematic drawing of a dual-phase membrane, according to one inventive concept.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 1 μm refers to a length of 1 μm±0.1 μm.

It is also noted that, as used in the specification and the appended claims, wt % is defined as the percentage of weight of a particular component is to the total weight of the mixture. Moreover, mol % is defined as the percentage of moles of a particular component is to the total moles of the mixture.

The present disclosure describes formation of material with pores of varying sizes. For the purposes of this disclosure, mesoscale pores, also known as mesopores, are defined as having a diameter in a range of about 2 nanometers (nm) to about 50 nm; while microscale pores, also known as micropores, are defined as having a diameter in a range of greater than 0 nm to less than about 2 nm. Macroscale pores, also known as macropores, are defined as having a size greater than 50 nm. Mesoporosity refers to a characteristic of a material having pores with a diameter of mesoscale. Microporosity refers to a characteristic of a material having pores with diameter of microscale. Macro-periodic porosity refers to a characteristic of a material having pores with diameters of macroscale.

The present disclosure includes several descriptions of exemplary "inks" used in an additive manufacturing process to form the inventive concepts described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such technique.

The following description discloses several preferred inventive concepts of molten hydroxide dual-phase membranes and/or related systems and methods.

In one general aspect of an inventive concept, a fuel cell system includes a cathode and an anode, a porous ceramic support positioned between the cathode and anode, and a molten electrolyte mixture in pores of the ceramic support.

In another general aspect of an inventive concept, a method for producing energy includes directing a gas stream through a cathode, where an inner side of the cathode is adjacent to a dual phase membrane including a ceramic support infiltrated with a molten electrolyte mixture, sweeping an outer side of the anode with water, where an inner side of the anode is adjacent to the dual phase membrane, and collecting energy from the anode. The dual phase membrane is sandwiched between the cathode and an anode.

A list of acronyms used in the description is provided below.

3D Three dimensional
AEM Anion exchange membrane
AEMFC Anion exchange membrane fuel cells
AFCs Alkaline fuel cells
AM Additive manufacturing
C Celsius
$CO_2$ Carbon dioxide
CsCl Cesium chloride
DIW Direct Ink Writing
GDL Gas diffusion layer
HCDP Hydroxide-ceramic dual phase
HOR Hydrogen oxidation reaction
KOH Potassium hydroxide
nm nanometer
$N_2$ Nitrogen
$O_2$ Oxygen
OH Hydroxide
ORR Oxygen reduction reaction
PEM Proton exchange membrane
PEMFC Proton exchange membrane fuel cell
Pt Platinum
PGM Platinum group metals
PμSL Projection micro stereolithography
S/cm siemens/centimeter
μM micron, micrometer
vol % volume percent
wt % weight percent Molten hydroxide dual-phase membranes may be used in hydrogen fuel cells (e.g. alkaline fuel cells (AFC)), but typically have been limited to use with pure oxygen ($O_2$) rather than air because the hydroxide dual-phase membranes become poisoned with $CO_2$. According to various inventive concepts described herein, molten hydroxide membranes designed for flue gas temperature $CO_2$ separation membranes (e.g., in fossil fuel power plants) may be used in conjunction with controlled humidity and modified electrolyte composition to overcome the $CO_2$ poisoning effect in air-breathing fuel cells that would otherwise be encountered with molten hydroxide based membranes. In turn, the usual $CO_2$ poisoning issue may be overcome by methods described herein by sweeping the $CO_2$ as it crosses the dual-phase membrane with water. Thus, various inventive concepts include a highly conductive, intermediate temperature dual-phase membrane useful for such things as fuel cells, oxygen separation, and ammonia production.

Polymeric anion exchange membranes can be immune to $CO_2$ poisoning. Typical polymer membranes contain quaternary ammonium or phosphonium group polymers that conduct $OH^-$ ions at temperatures below 80° C. However, such polymers are chemically unstable at high pH due to hydroxide ion attacks of the main chain and functional groups of the polymer. Moreover, the polymers have limited ionic conductivity rates, and poor mechanical performance leading to shorter lifetimes. Thus, an alternative membrane to polymeric anion exchange membranes would be desirable for use in alkaline fuel cells (AFCs).

Hydroxide conducting solid electrolytes can operate in an intermediate temperature regime. Moreover, the solid form avoids the poisoning issue of $CO_2$ in the fuel cell. However, even the most promising solid electrolytes suffer from limited ionic conductivity. For example, in one case a hydroxide conducting solid electrolyte that showed good chemical resistance, the highest ionic conductivity was reported to 0.01 siemens/centimeter (S/cm) at 100° C. to 200° C., which is still too low for high-power demand applications. Thus, it would be desirable to develop a membrane that combines the high ionic conductivity of liquid electrolyte with the temperature resistance of a solid membrane, for example a porous solid saturated with a liquid electrolyte, such as hydroxide $OH^-$ ions, such that the fuel cell could operate at intermediate temperature ranges (e.g. 150° C. to 400° C.) without compromising ionic conductivity.

According to various inventive concepts, an anion exchange membrane (AEM) fuel cell is described using a porous matrix saturated with molten electrolyte that operates at an intermediate temperature range. A promising electrolyte alkaline mixture includes OH− ion conducting electrolytes that may be in a molten state at an intermediate temperature range, for example, alkaline hydroxide mixtures having a melting point below 200° C. as anhydrous salts and below 150° C. when hydrated.

As would be understood by one skilled in the art, conductivity of concentrated aqueous solutions of KOH at 200° C. has been measured to be >2.8 S/cm for 55 wt % solution. Conductivity of molten NaOH—KOH eutectic mixture (51:49 mol %) at 723 K (450° C.) has been measured to be 1.78 S/cm. These generally understood values of ionic conductivity of the molten electrolyte solution may represent a theoretical upper limit of ionic conductivity in the membrane. Without wishing to be bound by any theory, the actual value of ionic conductivity of the fuel cell as described herein may be lower due to the dead volume caused by ceramic material of the membrane and the tortuosity of the conduction path.

In various approaches, molten hydroxide electrolytes operate in the AEM fuel cell described herein at intermediate temperatures and may offer exceptional ionic conductivity as high as 1.00 S/cm at temperatures greater than 150° C., which is two orders of magnitude higher than the best solid-phase AEM. In some approaches, the ionic conductivity may be greater than 0.50 S/cm at temperatures greater than 150° C. In come approaches, the ionic conductivity may be greater than 0.75 S/cm, 1.0 S/cm, 1.5 S/cm, etc. at temperatures greater than 150° C.

However, molten hydroxides have traditionally been considered to suffer from the same carbonate poisoning effect as aqueous hydroxides, and thus, molten hydroxides have been overlooked as potential electrolytes in air breathing AFCs (e.g. AFCs using air as the oxidant, which contains $CO_2$).

Various inventive concepts described herein overcome the problem of using liquid electrolytes in AFCs by using a dual phase molten hydroxide/ceramic support membrane that shifts the chemical equilibrium of the insoluble $K_2CO_3$ to KOH and $CO_2$ in the presence of water, thereby releasing $CO_2$ from the electrolyte in situ during operation. The dual-phase molten hydroxide membrane may function at the operating conditions of the intermediate temperature alkaline fuel cell, thus eliminating any additional steps for $CO_2$ removal from the air feed.

Various inventive concepts may incorporate, with the teachings herein, a hydroxide ceramic dual phase (HCDP) membrane which has been developed as a $CO_2$-selective ceramic membrane for $CO_2$ separation from power plant flue gas at flue temperatures (e.g. ranging from 250° C. to 600° C.). FIG. 1 shows a schematic diagram of a dual phase membrane process 100 of absorption and desorption of $CO_2$ using a dual phase membrane 102 that includes molten hydroxide 106 in a porous support 104. In one example, the hot flue gas may include $N_2$, $CO_2$, etc. that upon contacting the membrane 102, the $CO_2$ may be selectively absorbed by the molten hydroxide 106, according to Equation 1 (see above), to form $K_2CO_3$ and water.

The $CO_2$ absorbed with the molten hydroxide 106, present as carbonate $CO_3^{-2}$, in the porous support 104 may be transported across the membrane 102 and desorbed in a desorption step of Equation 2, thereby demonstrating a reversible reaction of the $CO_2$ with molten hydroxide 106 of the porous support 104.

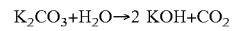

$$K_2CO_3 + H_2O \rightarrow 2\ KOH + CO_2 \quad \text{Equation 2}$$

The desorption step of Equation 2 may be initiated by low $CO_2$ pressure and steam to release $CO_2$ from the membrane on the sweep side of the porous support 104.

In more approaches, and preferable in some applications to reduce energy consumption associated with separation of offensive and/or acidic gases from gas mixtures such as flue gas, the presently disclosed inventive separation membranes and processes may accomplish separation without applying a pressure gradient via use of a sweep gas. For instance, in one embodiment water vapor may be passed across the permeate side of the membrane (opposite the side where offensive and/or acidic gases are present in high concentration, e.g. in the flue). Optionally, but advantageously, the sweep gas may apply pressure to the permeate side of the membrane.

Using a sweep gas is an attractive approach for several reasons. First, the water pushes the Equation 2 equilibrium over to favor $CO_2$ release on the permeate side of the membrane. Second, $CO_2$ separates at a higher rate than without sweep gas utilization, because the sweeping action maintains a larger $CO_2$ gradient across the membrane than a vacuum, with less energy. Third, if the steam pressure applied to the permeate side of the membrane is approximately equal to the pressure applied to the membrane by the gas mixture (e.g. flue side), there is no difference in total pressure across the membrane, which significantly relaxes the materials challenges for capillary action (pore size) and mechanical strength. Fourth, steam is already present and available in various suitable applications, such as power plants (where steam is used in the heat exchanger), obviating the need to provide external sources of steam and further improving energy efficiency of separation. Fifth, water vapor can be easily separated from the $CO_2$ after gas separation (e.g. via condensation), which further allows advantageous harvesting of heat from the water vapor. Accordingly, a faster movement of acid gases across the membrane may desirably minimize infrastructure quantity and cost of the overall separation process/solution.

Results of testing the HCDP membrane show a high performing $CO_2$ separation membrane in terms of permeability and selectivity. Similarly, various inventive concepts incorporating the HCDP membrane in a fuel cell may exhibit reduced $CO_2$ poisoning.

According to inventive concepts described herein and as shown in the schematic drawings of FIGS. 2A and 2B, a ceramic support 202 (e.g., membrane, dual phase membrane, etc.) may include a porous ceramic structure 204. FIG. 2B is a schematic drawing of the circle 2B of ceramic structure 204. FIG. 2B depicting a magnified portion of the porous ceramic structure 204, shows the porous ceramic structure 204 may have an open cell structure with a plurality of pores 208, where the pores 208 may connect through the ceramic structure 204 from one side of the ceramic structure to an opposite side of the ceramic structure.

In various approaches, the ceramic structure may include alumina ($Al_2O_3$), 8 mol % yttria fully stabilized zirconia (8 mol % $Y_2O_3$-doped $ZrO_2$ (8YSZ)), 3 mol % yttria (tetragonal zirconia polycrystal (3 mol % $Y_2O_3$-doped $ZrO_2$ (3Y-TZP)), $CeO_2$, 12 mol % $CeO_2$ tetragonal $ZrO_2$ polycrystal (12Ce-TZP), $ZrO_2$, $SiO_2$, $TiO_2$, $SnO_2$, etc. In preferred approaches, the ceramic structure may include 3 mol % $Y_2O_3$-doped $ZrO_2$. In other preferred approaches, the ceramic structure may include 8 mol % $Y_2O_3$-doped $ZrO_2$.

The porous ceramic structure 204 may be formed in any suitable configuration. While the configuration shown in FIG. 2A is characterized by a circular configuration, other shapes may be implemented without departing from the scope of the present disclosures. In various approaches, a variety of other geometries in various dimensions may be formed.

In some approaches, the porous ceramic material may have a geometry represented by multiple structures such that the resulting porous ceramic structure may have a diameter of about 1 to about 10 cm but could be smaller or larger. In some approaches, the porous ceramic material may be extruded, milled, or molded into shapes (e.g. cylinder, cube, etc.), etc. In some approaches, the formed structures of porous ceramic material may have pores, ligaments, features, etc. having a size of about 100 to about 200 nm.

According to inventive concepts described herein, the porous ceramic structure may function as a support for a liquid phase, where the liquid phase may be contained in the pores using capillary pressure. Preferably, the average pore size is such that the liquid phase substantially remains in the pores under conditions corresponding to the intended use of the resulting product. Furthermore, the porous ceramic structure infilled with a liquid may function as a membrane to selectively transport materials (e.g. $CO_2$) from one side of the membrane to the other. In some approaches, the pores may be a size that holds a liquid in a pore against an arbitrary pressure applied across the membrane. For example, smaller pores may withstand higher pressure applied across a membrane; however, smaller pores may result in a reduced capacity for liquid and a slower mass transport rate.

In some approaches, the porous ceramic structure may have pores having an average diameter sufficient to retain liquid by capillary action. In some approaches, the porous ceramic structure may have pores having an average diameter in a range of about 50 nm to about 500 nm, but the diameter of the pores may be lower or higher. In some approaches, the porous ceramic structure may have pores having a diameter in a range from approximately 75 nm to about several (e.g. 10) microns. As will be understood by persons having ordinary skill in the art upon reading the present descriptions, larger pore size is desirable to facilitate rapid mass transport through the membrane, but pores must be sufficiently small to retain the molten hydroxide phase within the matrix when subjected to the pressure gradient generated within the separation environment. In preferred approaches, the porous ceramic structure may have pores having an average diameter in a range of about 50 nm to about 300 nm.

Furthermore, pores may have an average diameter in a range from about 10 nm to about 1 mm, from about 100 nm to about 100 μm, from about 100 nm to about 10 μm, from about 200 nm to about 5 μm, or in a range from about 200 nm to about 1 μm, in various embodiments. As will be appreciated by skilled artisans upon reading the present disclosures, the pore size is critical to retention of hydroxide in pores of the porous support structure under a given pressure gradient.

In some embodiments, the density of the porous ceramic structure may be in a range of about 20% to about 50% of a density of a solid ceramic form, but could be higher or lower. In a preferred approach, the density of the porous ceramic structure may be in a range of about 20 wt % to about 50 wt % of a density of a solid ceramic form having the same composition as the porous ceramic structure. In some approaches, sintering the structure at higher temperature conditions may result in a density of the porous ceramic structure in a range of about 45 wt % to about 85 wt % of a density of a solid ceramic form.

Looking to FIG. 2A-2B, in some approaches, the porous ceramic structure 204 may include a molten hydroxide 206 in the pores 208, where the molten hydroxide 206 may be retained in the pores 208 by capillary action. In some approaches the porous ceramic structure may include a molten potassium hydroxide. In other approaches, the molten hydroxide may be a mixture of LiOH, NaOH, and KOH. In various approaches, the porous ceramic structure including a molten hydroxide may be used for capturing $CO_2$. In some approaches, the ceramic support 202 may include a porous ceramic structure 204 with hydroxide 206 disposed in the continuous pore system defined by the voids of the porous support.

In inventive concepts described herein, a porous ceramic structure may retain molten hydroxide in extreme conditions with long term stability, such as high temperatures over an extended period of time. In some approaches, the ceramic structure may have physical characteristics that enable the ceramic structure to retain the molten hydroxide in the pores after exposure to temperatures at about 400° C. for at least 100 hours under nitrogen gas ($N_2$). In some approaches, the ceramic structure may have physical characteristics that enable the ceramic structure to retain the molten hydroxide in the pores after exposure to high temperatures (e.g. 400° C.) for at least 1000 hours under nitrogen gas ($N_2$). In some approaches, the ceramic structure may have physical characteristics that enable the ceramic structure to retain molten hydroxide in the pores at high temperatures (e.g. 400° C.) for as long as 17,520 hours (i.e. 2 years).

According to inventive concepts described herein, the ceramic structure may have physical characteristics that enable the ceramic structure to retain the molten hydroxide in the pores after at least twenty heating and cooling cycles, wherein the heating may be to about 400° C. and the cooling may be to at least room temperature (room temperature may be between 20° C. to 25° C.). In some approaches, the porous ceramic structure may retain molten potassium hydroxide during greater than 40 heating and cooling cycles.

FIG. 3 depicts a system 300 an anion exchange membrane fuel cell, in accordance with one inventive concept. As an option, the present system 300 may be implemented in conjunction with features from any other inventive concept listed herein, such as those described with reference to the other FIGS. Of course, however, such system 300 and others presented herein may be used in various applications and/or in permutations which may or may not be specifically described in the illustrative inventive concepts listed herein. Further, the system 300 presented herein may be used in any desired environment.

In inventive concepts described herein, the membrane material used in an HCDP process, where the porous ceramic material functions as a membrane in a $CO_2$ separation process, may be used as a porous ceramic material in an anion exchange membrane (AEM) fuel cell. The porous ceramic material may function as a membrane saturated with liquid electrolytes and in conjunction with electrodes sandwiching the membrane participate in an electrochemical processes associated with AEM fuel cells. According to one inventive concept, as shown in FIG. 3, a fuel cell 300 may include an anion exchange membrane 302 that includes the porous ceramic support 304 positioned between the cathode 308 and anode 310, and a molten electrolyte mixture 306 in pores of the ceramic support 304. In some approaches, the ceramic support 304 may be saturated (e.g., completely filling, infiltrated, etc.) with liquid phase electrolyte 306 and anode and cathode electrodes, 310, 308 sandwich the anion exchange membrane 302.

In various inventive concepts described herein, an HCDP membrane has been adapted to a fuel cell membrane 302 by attaching electrodes to either side of the HCDP membrane. As would be understood by one skilled in the art, the electrode associated with the oxygen reduction reaction (ORR) is the cathode 308, and the electrode associated with the hydrogen oxidation reaction (HOR) is the anode 310. In some approaches, the cathode 308 may be configured to be a catalyst for an oxide reduction reaction, and the anode 310 may be configured to be a catalyst for a hydrogen oxidation reaction.

In various approaches, the cathode 308 and the anode 310 are porous. In one approach, the material of the cathode and a material of the anode may include the same material. In another approach, the material of the cathode and the material of the anode may include different materials.

In one approach, the cathode and/or anode may include at least one of the following: platinum group metals, nickel, copper, cobalt, mixed metal oxides, nickel cobalt alloys, a combination thereof, etc. Illustrative material of the electrodes may include nickel (Ni), cobalt (Co), etc. as would be understood by one skilled in the art.

In some approaches, the cathode and/or anode may include at least one of the following electrode materials: metal mesh, carbon material, metal particles, or a combination thereof.

Humidity of the air on the cathode side and the humidity of the hydrogen ($H_2$) gas on the anode side may be controlled. The concentration of the molten hydroxide mixture may be tuned to optimize melting point and ionic conductivity of the dual phase membrane. In some approaches, the temperature of the system including the membrane is above a melting point of the molten hydroxide mixture.

In some approaches, the ratio of components of the molten hydroxide mixture, for example but not limited to, lithium (Li), sodium (Na), and potassium (K), may be tuned to optimize melting point and ionic conductivity of the dual phase membrane. In other approaches, additives may be added to the molten hydroxide mixture to optimize melting point and ionic conductivity of the dual phase membrane. In some approaches, illustrative examples of additives to the molten hydroxide mixture may include cations such as cesium (Cs), rubidium (Rb), other cation hydroxides, etc.

In some approaches, the water content of the molten hydroxide mixture may be tuned to optimize melting point and ionic conductivity of the dual phase membrane. In one approach, the molten electrolyte mixture of the fuel cells may be configured to generate ionic conductivity up to 1.00 siemens per centimeter (s/cm) at temperatures less than about 150° C.

According to various inventive concepts described herein, an AEMFC membrane may be produced with a commercial high surface area carbon cloth coated with nickel (Ni) on carbon powder that may serve as a hydrogen oxidation reaction (HOR) catalyst. In a similar manner, an electrode coated with platinum (Pt)/carbon may serve as oxygen reduction reaction (ORR) catalyst. As would be understood by one skilled in the art, catalysts may include Pt catalysts and non-platinum group metal (PGM) catalysts.

In one approach, the fuel system may include a triple phase boundary region that includes three phases present at one location, e.g., solid:liquid:gas. In one approach of the fuel cell described herein the triple phase boundary region includes an electrode/catalyst as the solid: an electrolyte as the liquid: a fuel as the gas. For example, some approaches include an association of the cathode and/or anode, the molten electrolyte mixture, and a gas at one location. For purposes of this disclosure, a triple phase boundary is defined as the region of contact resulting from of three different phases present at one location: electrode/catalyst (solid), electrolyte (molten hydroxide as a liquid), and a gaseous fuel ($H_2$), oxidant ($O_2$), air, etc. In some approaches, the gas 303, 305, may include at least one of the following: hydrogen gas ($H_2$), oxygen gas ($O_2$), air, etc. The system may also include the gases carbon dioxide ($CO_2$), nitrogen gas ($N_2$), etc., however these gases do not participate in the fuel cell reaction, and are nonessential gases. Moreover, the presence of $CO_2$ in the system may react with the molten electrolyte, so removal of $CO_2$ from the system (as is provided by the steam sweep on the fuel (anode) side) is critical for the optimal performance, continued function, etc. of the fuel cell.

According to various approaches, a triple boundary region 320 at the cathode 308 may include an association of the cathode 308, the molten hydroxide mixture 306, and a gas 303, e.g., oxygen. Similarly, a triple boundary region 320 at the anode 310 may include an association of the anode 310, the molten hydroxide mixture 306, and a gas 305, e.g., hydrogen ($H_2$) gas, on the outer side 314 of the anode 310. In some approaches, the gas 305 may be a gaseous fuel.

In various approaches, electrode-membrane assemblies may be prepared to ensure optimal triple phase boundary, for example, by saturating the electrodes with molten hydroxide prior to assembly. The electrochemical reaction of the fuel cell that produces electricity occurs in the presence of these three phases, thus, the triple phase boundaries may be the active areas of the cell.

In various inventive concepts, an AEM fuel cell having a dual phase membrane as described herein, may include any catalyst/electrode material and may not be limited to specific materials, for example specifically PGM catalysts or specifically non-PGM catalysts. Illustrative examples of catalysts in the electrode material may include PGM catalysts, metal mesh, porous carbon, Ni, Co, Cu, NiCo alloys, etc.

Conventional fuel cell/battery systems operate with thin membranes in order to decrease the resistance arising from the membrane (area specific resistance). Thus, for conventional fuel cells, a thicker membrane leads to decreased performance of the fuel cell resulting from high ohmic loss. According to various inventive concepts described herein, the highly conductive molten hydroxide electrolyte may enable the use of thicker membranes for enhanced mechanical properties, without overly high resistance that typically would result in ohmic loss and performance decrease.

In one approach, the fuel cell includes a molten electrolyte mixture 306 that may include a molten hydroxide mixture. In one approach, the molten hydroxide mixture includes an alkaline hydroxide (OH⁻) having a melting point below 200° C. In various approaches, the molten hydroxide mixture includes at least of the following cations: lithium, sodium, potassium, cesium, rubidium, etc.

The movement of the hydroxide ions (OH⁻) in the fuel cell is electrochemical. The hydroxide ions (OH⁻) may be transported across the membrane 302 to the anode 310. The cathode 308 of the fuel cell 300 stack oxygen (O₂) may be reduced to hydroxide ions (OH⁻), as shown in Equation 3.

$$O_2 + H_2O + 2e^- \rightarrow 2OH^-$$ Equation 3

In one approach, the fuel system 300 may include an H₂ source 322. The hydroxide ions (OH⁻) may react with H₂ gas 305 from the H₂ source 322 to release electrons (e⁻) which are conducted in the external circuit 316, as shown in Equation 4.

$$2OH^- + H_2 \rightarrow 2H_2O + 2e^-$$ Equation 4

Water (H₂O) is released, which is the exhaust of the fuel cell 300. The electricity is created from the reaction of oxygen and hydrogen to produce water and electrons.

In some approaches, the ceramic support 304 with the molten hydroxide mixture as the molten electrolyte mixture 306 therein may be a hydroxide ceramic dual phase (HCDP) membrane 302.

In one approach, the fuel system 300 includes a water flow system 318 on an outer side 314 of the anode 310, where the outer side 314 of the anode 310 is opposite an inner side 312 of the anode 310, and the inner side 312 of the anode 310 is adjacent to the ceramic support 304. In one approach, water 319 from the water flow system 318 may sweep the anode 310 side of the membrane 302.

In air, there is a small, but significant concentration of CO₂, about 400 ppm, so if air is used as the oxidant, the CO₂ will likely "poison" the AEM. However, in CO₂ separation studies, the HCDP membrane has been used to remove CO₂ from flue gas. Thus, molten phase of hydroxide in the AEM reacts with the CO₂ to form carbonate CO₃²⁻, as shown in Equation 1.

Furthermore, by sweeping the anode 310 side of the membrane 302 with water (steam) (H₂O), hydroxide ions (OH—) may be regenerated from carbonate and CO₂ may be released (e.g. as exhaust), as shown in Equation 2. Thus, in this AEM fuel cell system, CO₂ is not being producing or consumed, rather the movement of CO₂ from the air across the membrane may be driven by the partial pressure difference of CO₂ on either side of the membrane, and thus, CO₂ may likely be present in the membrane while at the same time oxygen (O₂) is being transported across the membrane as hydroxide ions (OH⁻).

In various approaches, flowing water, for example in the form of steam, may be incorporated into the AEMFC system on the outer side of the anode to sweep the carbonate build-up in the molten hydroxide AEM, releasing CO₂, and thus allow the system to continue to operate in the presence of CO₂. In one approach, the water may be in the form of steam at a temperature above boiling point to maintain the molten nature of the molten electrolyte mixture of the membrane.

In various approaches, the operating temperature of the AEMFC using the porous ceramic support membrane may be lowered to below 200° C. by premixing the hydroxide solids with water prior to melting. The porous ceramic support may be filled with the molten hydroxide eutectic-water mixture to ensure the reversibility of the carbonate forming reaction to produce hydroxide and release CO₂, as in Equation 1 in the right to left direction of reaction.

In some approaches, the fuel system may be operable to generate electricity up to a temperature of 600° C. In preferred approaches, the fuel cell system may be operable to generate electricity at temperatures in a range of about 150° C. to about 400° C. In some approaches, the hydrogen feed may be humidified using equipment developed for CO₂ separation studies in order to ensure sufficient water delivery to the anode side (HOR) for continuous CO₂ removal at temperatures of 150° C. to 400° C.

Figure 8:
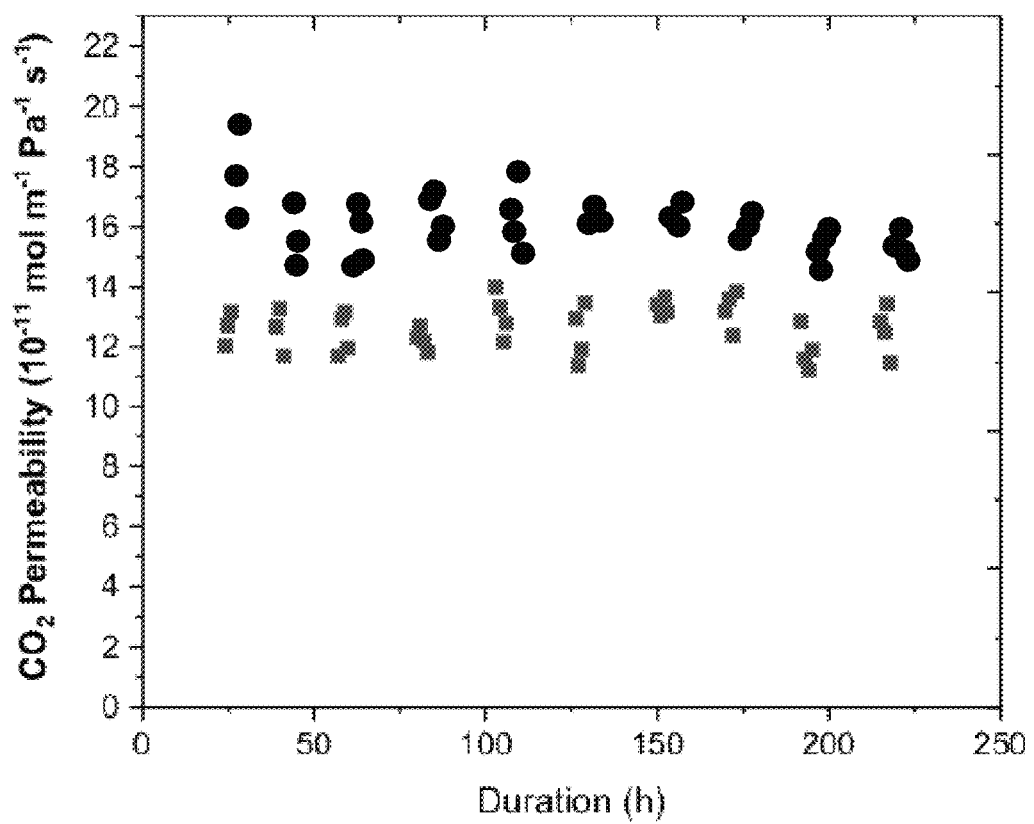
FIG. 8 is a plot of continuous operation of the porous ceramic support material as a $CO_2$ separation membrane over a prolonged period of time.

In some approaches, continuous membrane operation of the HCDP membrane has been shown to function efficiently for a prolonged period of time, see FIG. 8. Moreover, in some approaches, CO₂ may be reversibly absorbed and released into the molten phase of the dual phase membrane by controlling the humidity of the gas on the anode side. Moreover, the uptake of CO₂ is reversible and released from the membranes at temperatures as low as 300° C.

Figure 4:
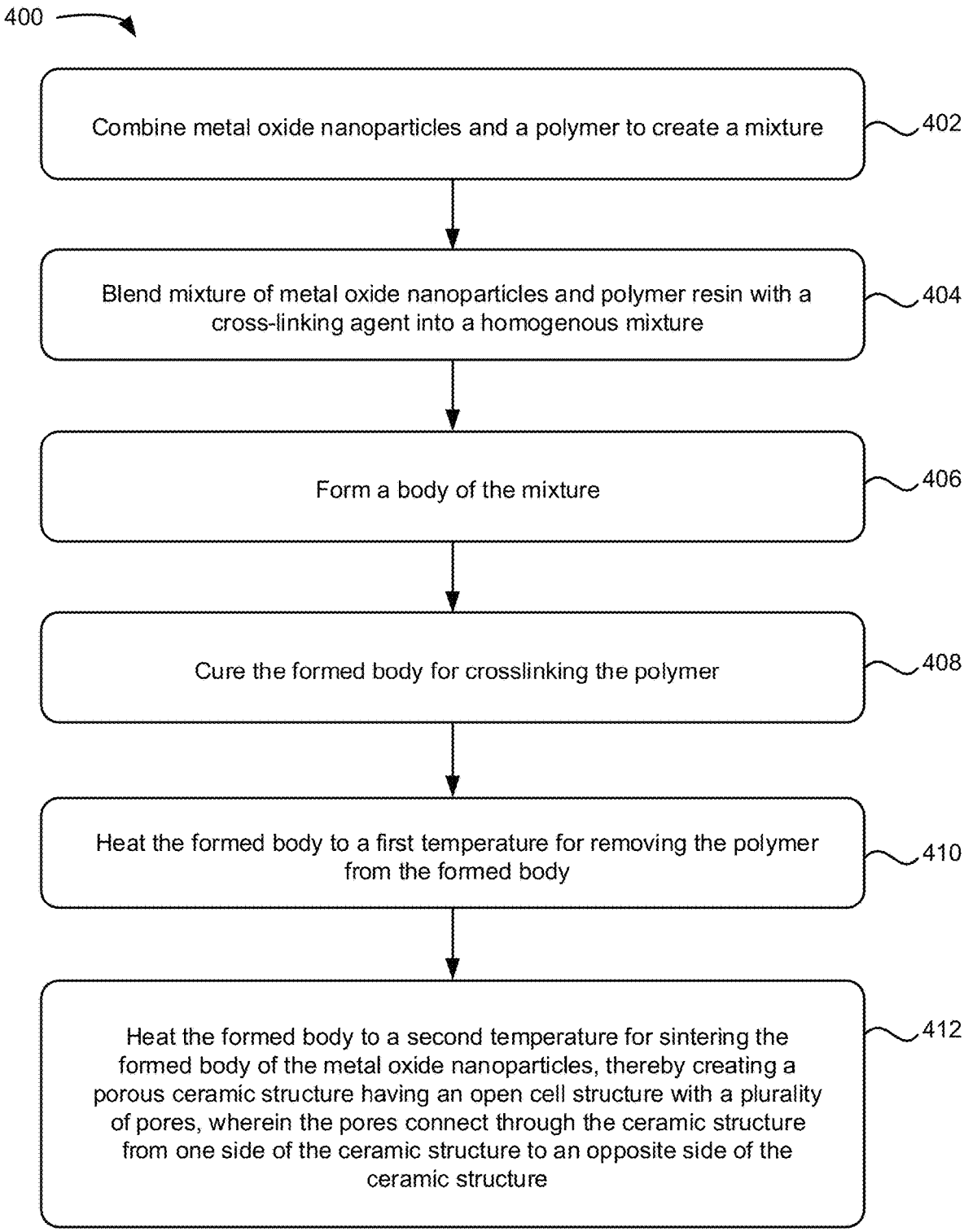
FIG. 4 is a flowchart of a method, according to one inventive concept.

In addition to developing the hydroxide chemistry and conditions for CO₂ absorption and release, new porous ceramic support material may maintain the highly caustic molten phase in the pores against model differential pressure. A method 400 as shown in FIG. 4 of fabricating a porous support ceramic membrane (e.g., HCDP membranes) is highly scalable and compatible with additive manufacturing (e.g. three-dimensional (3D) printing) methods such as direct ink writing (DIW) and projection micro-stereolithography (PμSL). In various approaches, the ceramic support (e.g., membrane, HCDP membrane, etc.) has physical characteristics of formation by an additive manufacturing technique. In various approaches, physical characteristics may include filaments arranged in a geometric pattern, a patterned (e.g., wavy, sinusoidal, ordered, etc.) outer surface defined by stacking filaments, a defined porosity (e.g., ordered, controlled, non-random, etc.), a porosity having pores with measurable average diameters, etc. Thus, using these additive manufacturing techniques allows engineering of parts and production of optimal geometry for efficient mass transport and mechanical strength.

As shown in FIG. 4, step 402 of method 400 includes combining metal oxide nanoparticles and a polymer to create a mixture. Many types of metal oxides can be used. Metal oxides, for example but not limited to, alumina (Al₂O₃), 8 mol % yttria fully stabilized zirconia (8 mol %

$Y_2O_3$-doped $ZrO_2$ (8YSZ)), 3 mol % yttria (tetragonal zirconia polycrystal (3 mol % $Y_2O_3$-doped $ZrO_2$ (3Y-TZP)), $CeO_2$, 12 mol % $CeO_2$ tetragonal $ZrO_2$ polycrystal (12Ce-TZP), $ZrO_2$, $SiO_2$, $TiO_2$, $SnO_2$, etc. may be obtained in nanoparticle form from commercial sources. In an exemplary approach, metal oxide nanoparticles may be yttrium-doped zirconium oxide. In some approaches, metal oxide nanoparticles may be synthesized using methods known by one skilled in the art. In some approaches, any ceramic particles that can be fused by sintering may be used. For example, but not limited to, ceramic particles such as nitrides, carbides, oxy-nitrides, carbides, etc. may be used as nanoparticles in some approaches.

In some approaches, metal oxide nanoparticles may have any conceivable size for nanoparticles. In some approaches, the size of the nanoparticles may be arbitrary, e.g. the size may be defined by ability of the nanoparticles to form homogeneous slurries, by the desired pore size of the resulting ceramic structure for a given application, etc.

In preferred approaches, a majority of the nanoparticles have a maximum dimension smaller than 1000 nm. In some approaches, metal oxide nanoparticles may have an average size in the range from about 20 nm to about 600 nm, but the size may be smaller or larger. In some approaches, larger nanoparticles may diminish nanoporosity of the porous ceramic structure. In some approaches, one mixture may include nanoparticles of different sizes.

The polymer may be a polymer resin. The polymer resin may generally include any cross-linkable polymer. The polymer resin may be an acrylate that can be cross-linked using a thermal initiator (e.g. a cross-linking agent), for example but not limited to, polyethylene glycol diacrylate (PEGDA) plus a thermal initiator (e.g. 3 wt % Luperox 231). In other approaches, the polymer resin may be an acrylate that may be cross-linked using an ultraviolet (UV) light-activated initiator.

Moreover, the polymer resin may include other materials.

The ratio of metal oxide nanoparticles in the polymer resin of the mixture may vary depending, for example, on the intended use, desired porosity, etc. In some approaches, the concentration of metal oxide nanoparticles in polymer resin of the mixture may be in the range of about 50 wt % to about 80 wt % metal oxide for ceramic loading. The concentration of metal oxide nanoparticles may depend on the type of nanoparticles and/or metal oxides in the metal oxide nanoparticles. For example, if the ratio results in a dilute mixture of nanoparticles in polymer resin, the particles may settle out of the solution, the final porous ceramic structure may not have a final density high enough for mechanical strength, etc. Moreover, if the ratio results in a concentrated mixture of nanoparticles in polymer resin, the mixture may be too difficult to process, and not have an appropriate viscosity, e.g. the mixture may resemble clay rather than flowable, viscous liquid usable for molding.

The physical characteristics of the porous ceramic membrane, for example, but not limited to density, pore morphology, mechanical properties, etc., may be tuned by varying the ratio of metal oxide nanoparticles to polymer resin. In some approaches, the process conditions may be particularly selected depending on the ratio of metal oxide nanoparticles to polymer resin, as would be appreciated by one skilled in the art upon reading the present description.

In various approaches to step 402 of method 400, the mixture may be combined using techniques known in the art, for example but not limited to, sonication, resonant acoustic mixing (RAM), vortex, etc.

Step 404 of method 400 includes blending the mixture of metal oxide nanoparticles and a polymer with a conventional cross-linking agent into a homogenous mixture. In some approaches, the cross-linking agent may be a liquid. In other approaches, the cross-linking agent may be a solid. In some approaches, the cross-linking agent may be a thermal initiator. In other approaches, the cross-linking agent may be a photo-initiator, e.g. 2-hydroxy-2-methylpropiophenone. In some approaches, the cross-linking agent blended in the homogenous mixture may be Luperox®.

In some approaches, the mixture of metal oxide nanoparticles in polymer resin may be blended into homogenous suspension slurry of nanoparticles to ensure uniform density of nanoparticles throughout the composite. In some approaches the mixture may be blended by sonication. In other approaches, the mixture may be blended using a mechanical mixer, for example, a resonant acoustic mixer.

Step 406 of method 400 involves forming a body of the mixture. In some approaches, step 406 involves forming a body by using the blended slurry ceramic mixture from step 404 as a feedstock for various additive manufacturing (AM) processes.

In some approaches, step 406 may include using the blended slurry mixture as an ink for direct ink writing (DIW), where the ink is extruded from a nozzle to form a printed 3D structure (e.g., a log-pile 3D structure, hollow 3D cylinder, etc.).

In some approaches, step 406 may include using the blended slurry mixture as a UV-curable polymer resin to be used in projection micro-stereolithography (PμSL) in which a patterned part of the porous geometric ceramic structure is formed. For example, and not meant to be limiting in any way, a 3D computer-aided design (CAD) model may be used for a digital mask to shine a pattern of light via beam delivery. A pattern may be projected through a projection lens onto a substrate in a bath of UV-curable ceramic/resin (e.g., the blended slurry mixture). A 3D structure polymer part may be formed as the projected light reacts with the UV-curable ceramic/resin, and subsequent layers of the forming 3D polymer part are formed as the substrate on the elevator moves the substrate in the z-direction.

In some approaches, the patterned 3D polymer part formed using PμSL additive manufacturing techniques has filaments arranged in a geometric shape designed by a CAD model.

Following formation of body with the blended slurry mixture, step 408 includes curing the formed body. The process of curing the formed body may depend on the polymer and cross-linking agent used in creating the mixture. In some approaches, the homogenous mixture of metal oxide nanoparticles, polymer resin, and cross-linking agent is formed in the mold and then cured to induce cross-linking and to produce parts of arbitrary dimensions. In other approaches, the homogenous mixture of metal oxide nanoparticles, polymer resin, and cross-linking agent in the mold may be cured by UV light. In another approach, the slurry ceramic mixture may be printed into a 3D structure having a desired shape, and then cured.

Step 410 of method 400 includes heating the formed body to a first temperature for removing the polymer from the formed body. Step 410 may be performed at atmospheric pressure and under air. In some approaches of step 410, the heating the formed body to a first temperature may be stepwise heating process where the formed body of cured mixture may be heated to one temperature at a defined rate and then held at the temperature for a defined amount of time. The temperature may be raised at a defined rate to a higher hold temperature for a defined amount of time. These steps may be repeated. A final step of the first heating process may include cooling at a set rate. In some approaches, the parameters (e.g. temperature, rate of temperature change, timing, atmosphere, etc.) for step 410, a first heating process for removing the polymer, may depend on the materials, e.g. metal oxide nanoparticles, polymer resin, etc. In some approaches, the molded form may be heated to 400° C. for two hours to remove the polymer.

Step 412 of method 400 includes heating the formed body to a second temperature for sintering the formed body of metal oxide nanoparticles. In some approaches, the second temperature for sintering may be different from the first temperature for removing the polymer. In some approaches, step 412 sinters the formed body of metal oxide nanoparticles, thereby creating a porous ceramic structure having an open cell structure with a plurality of pores, where the pores connect through the ceramic structure from one side of the ceramic structure to an opposite side of the ceramic structure. In some approaches, the metal oxide nanoparticles may be sintered to form a monolithic ceramic piece with pores.

In some approaches, step 412 of heating the formed body for sintering may include two or more heating steps. In some approaches of step 412, the heating the formed body to a second temperature may be stepwise heating process where the formed body of cured mixture with the polymer removed may be heated to one temperature at a defined rate and then held at the temperature for a defined amount of time. Then the temperature may be raised at a defined rate to a higher hold temperature for a defined amount of time. These steps may be repeated. A final step of the second heating process may include cooling at a set rate. The absence of polymer in the resulting sintered porous ceramic structure may be confirmed by thermogravimetric analysis (TGA).

In some approaches, the parameters (e.g. temperature, rate of temperature change, timing, atmosphere, etc.) step 412 involving the sintering process may depend on metal oxide nanoparticles as would be appreciated by one skilled in the art upon reading the present description. In some approaches, the optimal sintering temperature may depend on the metal oxide nanoparticles in the mixture. In some approaches, the second temperature for sintering may be in a range of about 1100° C. to about 1300° C. The duration of time for heating at the second temperature for sintering the formed structure may be in a range of about 3 hours to about 15 hours. As an example, but not to be limiting in any way, formed structures of metal oxide nanoparticles may be heated to 1100° C. for 15 hours to sinter the structures. For some metal oxide nanoparticles, higher sintering temperatures may result in higher coarsening of the particles such that the sintered structure may have lower surface area and larger pores.

In one embodiment, a formed cast of a cured mixture may be removed from a mold, followed by heating the formed cast to remove the polymer content and sintering the cast to create pores in the cast. The resulting porous ceramic structure may be used as a porous ceramic structure may function as support material for catalysis applications. In an exemplary approach, the resulting porous ceramic structure may be used as a support structure for a HCDP membrane.

Figure 5:
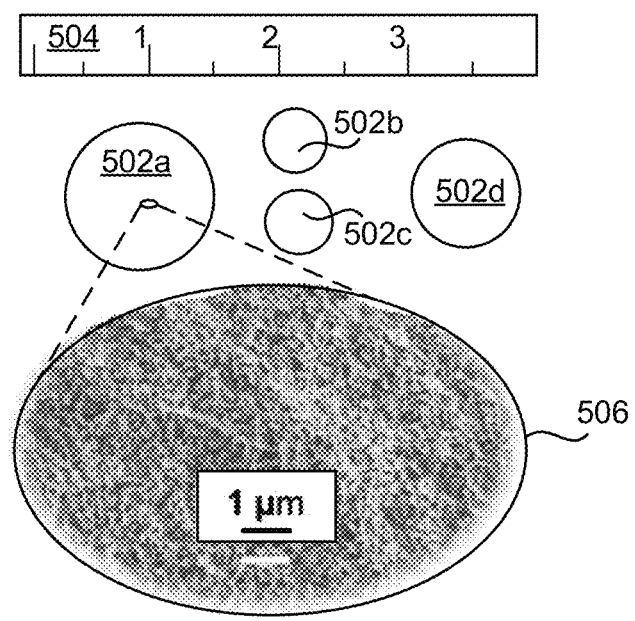
FIG. 5 is an image of porous ceramic support material that may be produced in arbitrary shapes and sizes, according to one inventive concept.

FIG. 5 shows that a porous ceramic support material 502a, b, c, d can be fabricated in arbitrary shapes and sizes that may be compatible with additive manufacturing techniques (3D printing) as described herein. As shown with a ruler 504 as marked in inches, for reference, shapes may be as fabricated to pre-defined sizes having a defined average diameter as high as 1 inch, but may be higher. In principle, the methods and products described herein do not have a dimensional restriction to the size of support that may be produced. Moreover, 3D printing of the HCDP membrane allows optimized membrane geometries for enhanced performance such as increasing rate of a thin active layer for fast OH- anion transport across the membrane by fabricating a thin active layer as a membrane, supporting the membrane structure for mechanical integrity, etc.

Portion 506 of the schematic drawing of a porous ceramic support material 502a is a scanning electron microscopy image of porous ceramic support material 502a showing the porosity of a ceramic support material 502a relative to a micron length.

In some approaches, the methods of fabrication of the porous ceramic support membrane may not be limited by size and, thus, large scale fabrication of the porous ceramic support membrane may benefit larger applications of the fuel cell. In other approaches, the fabrication of an optimized geometry of the porous ceramic support may be useful for producing fuel cell stacks. For example, a thinner active phase of the porous ceramic membrane may be preferred so that the anions do not travel as far thereby increasing the rate and flux of the anions through the membrane and across the electrodes. In the case of a thin porous ceramic membrane, the thickness of the membrane may be optimized to provide mechanical stability. In some approaches, the porous ceramic support material may be used with molds to produce membranes of arbitrary dimensions, including uniform sheets less than 100 µm thick.

In some approaches, the extent of ohmic loss may be tuned by the thickness of the membrane support, such that it would be desirable to prevent high ohmic loss that may occur in thicker membrane supports. In some approaches, the ohmic drop across the membrane may be lowered by using a thin porous ceramic membrane. For example, an HCDP membrane having a thickness of 1 mm may be replaced with an HCDP membrane having a thickness of 0.3 mm to decrease an area specific resistance.

As discussed herein and described, the HCDP membrane may overcome the $CO_2$ poisoning issue during the transport of hydroxide ions ($OH^-$) in molten hydroxide electrolyte system by shifting the chemical equilibrium of the undesired carbonate ions ($CO_3^{2-}$) toward hydroxide and $CO_2$ in the presence of water, thus releasing $CO_2$ from the electrolyte in-situ during operation, as described herein. In some approaches, the HCDP membrane may operate continuously for longer than 11 days (about 230 hours) with continuous uptake $CO_2$, e.g., for example as high as having $CO_2$ concentrations of 20% (much higher than the 0.04% of $CO_2$ present in air), and having a release of $CO_2$ from the HCDP membranes at temperatures as low as 300° C.

In various approaches, the temperature may be reduced by modifications to the electrolyte composition, including varying the ratio of cations (i.e. Li:Na:K) and added water, which can remain in the molten hydroxide mixture in molar concentrations at temperatures >200° C. In some approaches, addition of water to a molten hydroxide eutectic mixture may decrease the melting point of the eutectic mixture. The effect of change in ionic conductivity with various mole fraction of water may be optimized in an AEMFC system, as would be understood by one skilled in the art.

According to various inventive concepts described herein, the HCDP membrane may function at the operating conditions of the intermediate temperature AEMFC and the fuel cell functions efficiently with an air feed that may contain $CO_2$. In other words, there is no need to remove $CO_2$ from the air feed.

In addition to developing the hydroxide chemistry and conditions for $CO_2$ absorption and release, the porous ceramic support material is resistant to damage by the highly caustic molten phase of the molten hydroxide. Moreover, the porous ceramic support material of the membrane retains the liquid (e.g. molten hydroxide) in the pores of the material (having an average diameter of 50 nm to 100 nm) by capillary action against a modest differential pressure across the membrane. The fabrication of the porous ceramic support membrane allows physical properties, for example, density, pore size, etc., to be tuned with simple modifications to the processing conditions.

It may be noted that insufficient electrolyte fixation of the molten hydroxide in the pore structure of the porous ceramic material may lead to fuel leakage to the air side that may result in performance loss due to chemical combustion of fuel and oxidant. However, the degree of electrolyte fixation on the porous ceramic support material may be optimized by the tunable characteristics of the porous ceramic support material, such that the tunable characteristics include porosity, pore diameter, membrane thickness, etc. In addition, the viscosity of the molten hydroxide eutectic mixture may be tuned for optimal electrolyte fixation in the pore structure of the porous ceramic material.

In various inventive concepts described herein, the AEMFC using the porous ceramic support membrane material may have physical characteristics that promote efficient and durable fuel cell performance. As would be understood by one skilled in the art, physical characteristics of a fuel cell include thermal stability, phase stability, mechanical stability, and activity across range of operating temperatures.

Figure 6:
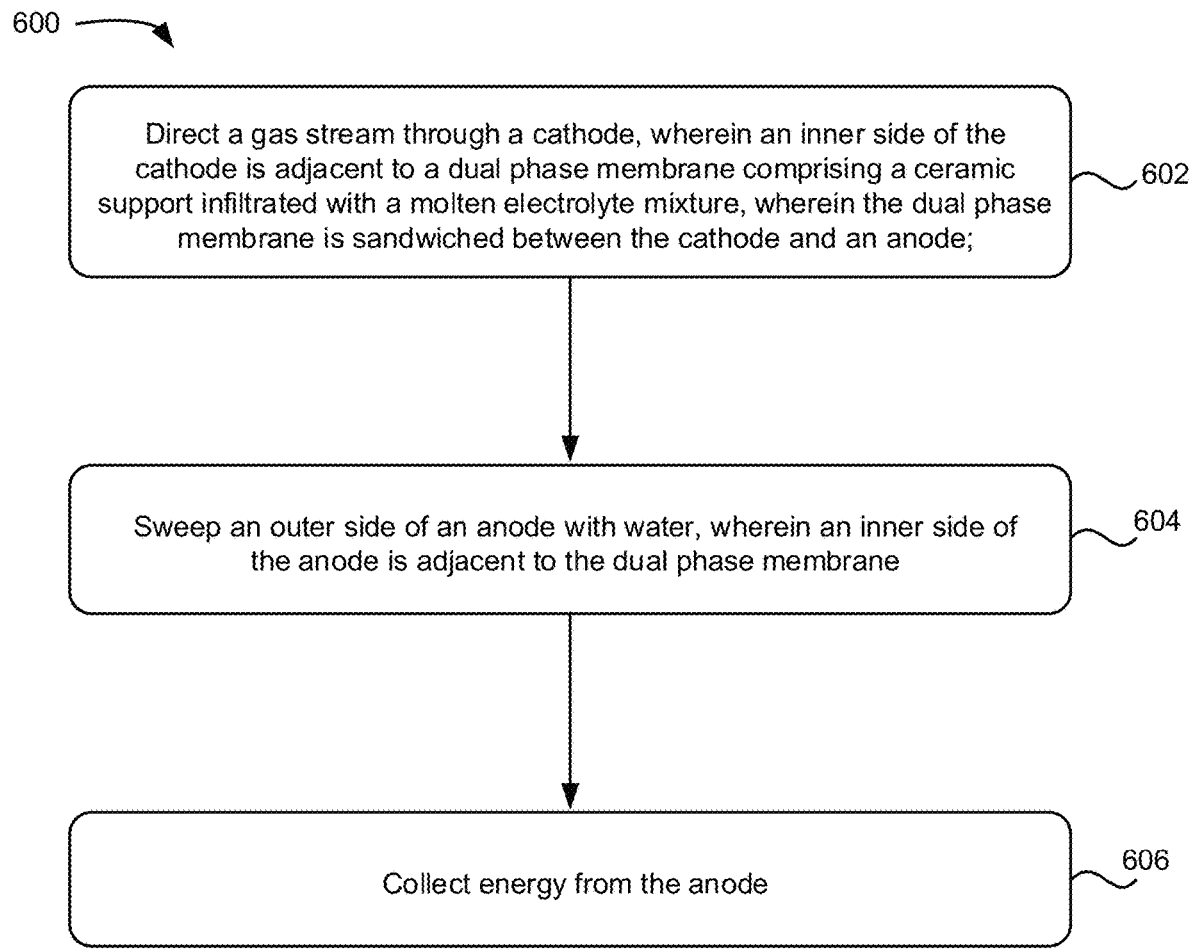
FIG. 6 is a flowchart of a method, according to one inventive concept.

FIG. 6 shows a method 600 for producing electrical energy in accordance with one inventive concept. As an option, the present method 600 may be implemented to produce energy using fuel cells such as those shown in the other FIGS. described herein. Of course, however, this method 600 and others presented herein may be used to provide applications of fuel cells which may or may not be related to the illustrative embodiments listed herein. Further, the methods presented herein may be carried out in any desired environment. Moreover, more or less operations than those shown in FIG. 6 may be included in method 600, according to various embodiments. It should also be noted that any of the aforementioned features may be used in any of the embodiments described in accordance with the various methods.

Operation 602 of method 600 begins with directing a gas stream through a cathode, where an inner side of the cathode is adjacent to a dual phase membrane that includes a ceramic support infiltrated with a molten electrolyte mixture. The dual phase membrane is sandwiched between the cathode and an anode.

In some approaches, the molten electrolyte mixture includes a molten hydroxide mixture. In some approaches, the gas stream is air. In one approach, the air includes carbon dioxide gas and oxygen gas. The dual phase membrane uptakes the gases from the gas stream, e.g., $O_2$, $CO_2$, etc. The cathode is configured to be a catalyst for the oxide reduction reaction of reducing the gases of the gas stream as the gases absorb into the dual phase membrane. For example, in one approach, contacting the $CO_2$ and molten hydroxide mixture forms a carbonate, e.g., reducing $CO_2$ to $CO_3^{2-}$.

Operation 604 includes sweeping an outer side of an anode with water, where an inner side of the anode is adjacent to the dual phase membrane. In some approaches, the water is provided from a system as described herein. The anode is configured to be a catalyst for hydrogen oxidation reactions. For example, in one approach contacting $CO_3^{2-}$ with water at the anode forms $CO_2$. In one approach, $OH^-$ ions are regenerated. Further, contacting $OH^-$ with $H_2$ at the anode releases water and generates electrons.

Operation 606 of method 600 includes collecting energy from the anode. The hydrogen oxidation reactions at the anode generate electrons, and the electrons travel through the circuit producing current, e.g., energy, electricity, electrical energy, etc.

In exemplary approaches, the method 600 may be performed with the molten electrolyte mixture at a temperature in a range of 150° C. to about 400° C.

Figure 7:
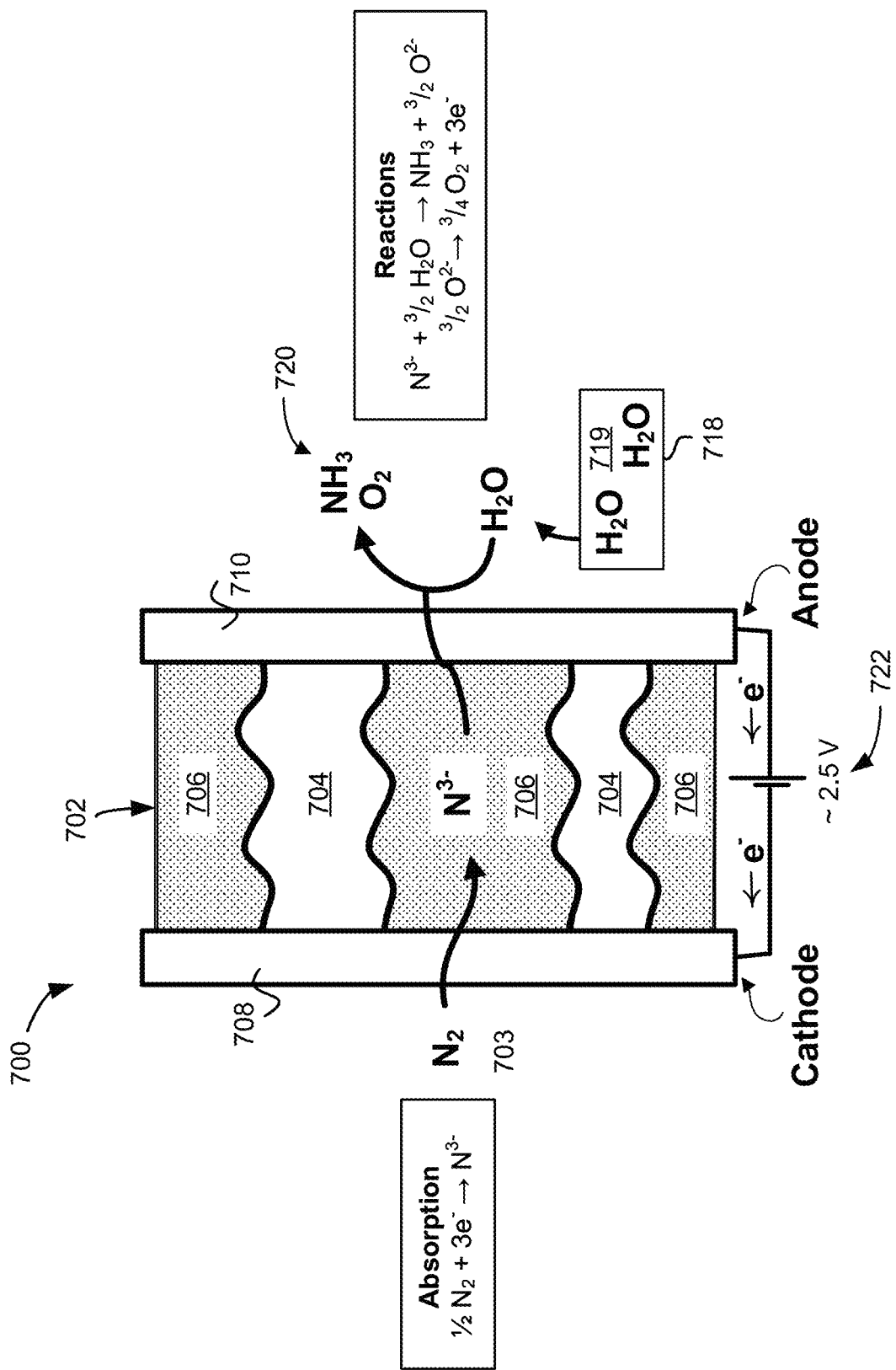
FIG. 7 is a schematic drawing of a dual-phase membrane used in synthesis of ammonia, according to one inventive concept.

FIG. 7 depicts a system 700 includes a dual phase membrane for ammonia synthesis, in accordance with one inventive concept. As an option, the present system 700 may be implemented in conjunction with features from any other inventive concept listed herein, such as those described with reference to the other FIGS. Of course, however, such system 700 and others presented herein may be used in various applications and/or in permutations which may or may not be specifically described in the illustrative inventive concepts listed herein. Further, the system 700 presented herein may be used in any desired environment.

In one inventive concept, the dual phase membrane may be used for ammonia production. As illustrated in FIG. 7, a system 700 includes a dual phase membrane 702 for synthesis of ammonia. In some approaches, the dual phase membrane 702 may include porous ceramic membrane material 704 and a molten electrolyte mixture 706. In some approaches, illustrative components of the molten electrolyte mixture 706 may include Li, Na, and cesium chloride (CsCl). In addition, the fuel system 700 includes a power source 722 for applying a voltage differential across the electrodes 708, 710.

In some approaches, the system 700 includes porous electrocatalysts, e.g., a cathode 708 and an anode 710, that sandwich the dual phase membrane 702. According to a principle of electrolytic ammonia synthesis from water and nitrogen gas, an applied voltage differential between the anode 710 and the cathode 708 may drive the following reactions in response to a $N_2$ feed 703 at the cathode 708, as shown in Equation 5, across the dual phase membrane 702 with a water sweep at the anode 710, as shown in Equations 6 and 7:

Absorption ½ $N_2 + 3e^- \rightarrow N^{3-}$            Equation 5

Reaction $N^{3-} + 3/2\ H_2O \rightarrow 3/2\ O^{2-}$          Equation 6

Reaction $3/2\ O^{2-} \rightarrow ¾\ O_2 + 3e^-$           Equation 7

In some approaches, the water sweep of $H_2O$ 719 at the anode 710 may be generated from a water system 718.

According to various inventive concepts described herein, a dual phase membrane 702 in a system 700 may enable electrolytic ammonia ($NH_4$) synthesis 720 from water ($H_2O$) 719 and nitrogen gas ($N_2$) 703.

Experiments

According to various inventive concepts described herein, an AEMFC membrane may be produced with a commercial high surface area carbon cloth coated with nickel (Ni) on Vulcan carbon powder (Cabot Corporation, Alpharetta, GA) that may serve as a hydrogen oxidation reaction (HOR) catalyst.

As shown in FIG. 8, the HCDP membrane operates continuously for longer than 11 days (about 230 hours) with continuous uptake of concentrations of 20% $CO_2$ (much higher than the 0.04% of $CO_2$ present in air) as well as release of $CO_2$ from the HCDP membranes at temperatures as low as 300° C. FIG. 8 is a plot showing the continuous operation of the porous ceramic membrane as a $CO_2$ separation membrane under two different operating conditions: solid circles (●) represent $CO_2$ permeability under wet sweep gas conditions and solid squares (■) represent $CO_2$ permeability under dry sweep gas conditions at 550° C. with a feed mixture of 20 mol % $CO_2$ and 80 mol % $N_2$ at 0.5 psi of pressure difference. In addition, FIG. 8 demonstrates that the system as described herein may reversibly absorb and release $CO_2$ into the molten phase of the dual phase membrane by controlling the humidity of the gas on the anode side. An HCDP membrane for more than 11 days with higher concentrations of $CO_2$ (as high as 20 vol % of incoming flue gas) compared to the typical concentration of $CO_2$ in air (approximately 400 ppm, or roughly 0.04 vol %).

In Use

Various inventive concepts described herein may be used in fuel cells, used for oxygen separation, and used for ammonia production.

The inventive concepts disclosed herein have been presented by way of example to illustrate the myriad features thereof in a plurality of illustrative scenarios, inventive concepts, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various inventive concepts have been described above, it should be understood that they have been presented by way of example only, and not limitation. Thus, the breadth and scope of an inventive concept of the present invention should not be limited by any of the above-described exemplary inventive concepts, but should be defined only in accordance with the following claims and their equivalents.

What is claimed is:

1. A fuel cell system, comprising:
a cathode and an anode;
a porous ceramic support positioned between the cathode and anode, wherein the ceramic support is comprised of zirconia stabilized with yttria;
a molten electrolyte mixture in pores of the ceramic support; and
a water flow system on an outer side of the anode, wherein the outer side of the anode is opposite an inner side of the anode, wherein the inner side of the anode is adjacent to the ceramic support, wherein the water flow system is configured to sweep steam across the outer side of the anode.

2. A fuel cell system as recited in claim 1, wherein the fuel cell system is operable to generate electricity up to a temperature of 600 degrees Celsius.

3. A fuel cell system as recited in claim 1, wherein the fuel cell system is operable to generate electricity at temperatures in a range of about 150 degrees Celsius to about 400 degrees Celsius.

4. A fuel cell system as recited in claim 1, wherein the molten electrolyte mixture includes a molten hydroxide mixture, wherein the molten hydroxide mixture includes an alkaline hydroxide having a melting point below 200 degrees Celsius.

5. A fuel cell system as recited in claim 4, wherein the ceramic support with the molten hydroxide mixture therein is a hydroxide ceramic dual phase membrane.

6. A fuel cell system as recited in claim 4, wherein the molten hydroxide mixture includes at least one cation selected from the group consisting of: lithium, sodium, potassium, cesium, and rubidium.

7. A fuel cell system as recited in claim 1, wherein the cathode and the anode are porous.

8. A fuel cell system as recited in claim 1, wherein the cathode is configured to be a catalyst for an oxide reduction reaction, wherein the anode is configured to be a catalyst for a hydrogen oxidation reaction.

9. A fuel cell system as recited in claim 1, wherein a material of the cathode and a material of the anode include the same material.

10. A fuel cell system as recited in claim 1, wherein a material of the cathode and a material of the anode include different materials.

11. A fuel cell system as recited in claim 1, wherein the cathode and/or anode include at least one metal selected from the group consisting of: platinum group metals, nickel, copper, cobalt, mixed metal oxides, nickel cobalt alloys, and a combination thereof.

12. A fuel cell system as recited in claim 1, wherein the cathode and/or anode includes an electrode material selected from the group consisting of: metal mesh, carbon material, metal particles, and a combination thereof.

13. A fuel cell system as recited in claim 1, wherein the molten electrolyte mixture is configured to generate ionic conductivity greater than 0.50 siemens per centimeter at temperatures greater than 150 degrees Celsius.

14. A fuel cell system as recited in claim 1, comprising a triple phase boundary region, wherein the triple phase boundary region includes an association of the cathode and/or anode, the molten electrolyte mixture, and a gas.

15. A fuel cell system as recited in claim 14, wherein the gas is selected from the group consisting of: hydrogen gas, oxygen gas, and air.

16. A fuel cell system as recited in claim 1, wherein the ceramic support has physical characteristics of formation by an additive manufacturing technique.

17. A fuel system as recited in claim 1, wherein the porous ceramic support comprises pores having an average diameter sufficient to retain liquid by capillary action.

18. A fuel system as recited in claim 1, wherein the porous ceramic support comprises pores having an average diameter in a range of 50 nanometers to about 10 microns.

19. A fuel system as recited in claim 1, wherein the porous ceramic support comprises pores having an average diameter in a range of 50 nm to about 500 nm.

20. A fuel cell system as recited in claim 1, wherein the porous ceramic support comprises pores configured to retain liquid by capillary action during exposure of the support to temperatures at about 400 degrees Celsius for greater than 100 hours.

21. A fuel cell system, comprising:
a cathode and an anode;
a porous ceramic support positioned between the cathode and anode;
a molten electrolyte mixture in pores of the ceramic support;
a power source for applying a voltage differential across the cathode and the anode; and a water flow system on an outer side of the anode, wherein the outer side of the anode is opposite an inner side of the anode, wherein the inner side of the anode is adjacent to the ceramic support, wherein the water flow system is configured to sweep steam across the outer side of the anode, wherein the fuel cell system is configured to synthesize ammonia from water and nitrogen gas.

22. A fuel cell system, comprising:

a cathode and an anode;

a porous ceramic support positioned between the cathode and anode;

a molten electrolyte mixture in pores of the ceramic support; and a water flow system on an outer side of the anode, wherein the outer side of the anode is opposite an inner side of the anode, wherein the inner side of the anode is adjacent to the ceramic support, wherein the water flow system is configured to sweep steam across the outer side of the anode.

23. A method for producing energy from the fuel cell system of claim 22, the method comprising:

directing a gas stream through the cathode;

sweeping an outer side of the anode with water; and collecting energy from the anode.

\* \* \* \* \*